United States Patent [19]
Lee

[11] 3,758,780
[45] Sept. 11, 1973

[54] OPTICAL-BINARY CODED POSITION-SENSITIVE RADIATION DETECTOR

[75] Inventor: Lap Yen Lee, Houston, Tex.

[73] Assignee: The United States of America as represented by the United States Atomic Energy Commission, Washington, D.C.

[22] Filed: Nov. 8, 1972

[21] Appl. No.: 304,873

[52] U.S. Cl. ............. 250/221, 250/71.5 S, 250/227
[51] Int. Cl. .............................................. G01t 1/20
[58] Field of Search ................... 250/71.5 R, 71.5 S, 250/227

[56] References Cited
UNITED STATES PATENTS

| | | | |
|---|---|---|---|
| 3,594,577 | 7/1971 | Loveday | 250/71.5 R |
| 3,265,892 | 8/1966 | Sheldon | 250/71.5 R |
| 3,509,341 | 4/1970 | Hindel et al. | 250/71.5 S |
| 3,436,757 | 4/1969 | Schwab | 250/227 |

*Primary Examiner*—Harold A. Dixon
*Attorney*—Roland A. Anderson

[57] ABSTRACT

A position-sensitive radiation detection system has been provided for use with scintillation detection mediums wherein the position of a radiation event within a block of scintillation material is determined by an optical-binary coding system such that a digital signal output is provided which is indicative of the position of a radiation event within the scintillator. The image of the scintillator is formed onto the light sensitive areas of a plurality of photomultiplier tubes by means of a corresponding plurality of lenses. A coded screen or mask is placed between each lens and its corresponding photomultiplier tube in the position of the image to obstruct a selected portion of the image from the view of each photomultiplier so that the output of each photomultiplier tube provides one digit of a multiple bit binary signal to indicate the location of the event. The first digit or least significant bit would come from a photomultiplier tube number one which would have a screen which obstructs one-half of the image so that the output would be either a binary "1" or "0" depending upon which half of the scintillator is struck by a single beam of ionized radiation to generate a light pulse with the detector medium. A second screen with two slits is placed in position of the image on a second photomultiplier tube to divide the image of the scintillator into four parts and forms the second bit of the binary signal, thereby dividing the images into four sections as would be coded at the outputs of photomultipliers one and two; and so on for additional photomultipliers. The screen may provide either rectangular or polar coordinate measurements and the outputs of the photomultipliers may be stored in a digital storage device or connected to an analog signal for oscilloscope display or other recording.

10 Claims, 7 Drawing Figures

OPTICAL-BINARY CODED POSITION-SENSITIVE RADIATION DETECTOR

BACKGROUND OF THE INVENTION

The present invention was made during the course of, or under, a contract with the United States Atomic Energy Commission.

This invention relates to radiation detectors and more specifically to position-sensitive radiation detection systems.

In the prior art various systems have dealt with the spatial detection of radiation, particularly from a distributed source such as radioactive materials introduced into animal subjects. The disposition of the material may be recorded by exposing a photographic film to the emitted radiation, but the process requires a long exposure time. Improved methods have been proposed which used scintillators. The light flashes emitted from the scintillator when struck by radiation are photographed or observed by other means. These systems are limited in that the light emissions are gathered by a limited number of immediately proximal light-detectors, each of which exclusively surveys a substantial portion of the scintillator. No provision is made for detecting the position of a scintillation with any greater accuracy than the surveyed portion the scintillation occurs within.

Other scintillation camera systems have been developed in which an image of a distributed radiation source is mapped by a plurality of photomultiplier tubes which are spaced to view overlapping areas of a scintillator. Such a system is described in U. S. Pat. No. 3,011,057, issued Nov. 28, 1961, to Hal O. Anger for "Radiation Image Device." In this system, radiation such as gamma rays from a distributed source are directed as by a multiaperture collimator onto a scintillator block. The array of photomultiplier tubes is disposed behind the scintillator to view overlapping areas of the scintillator. When a scintillation occurs, the light derived thereby is divided among the tubes, with the closest tube receiving the most light. Analog pulses from the phototubes go first to a signal mixing network and then to a position computing network which produces an analog output signal as a function of its position upon the scintillator and of the intensity of the scintillation brightness. In turn, the signals from the computer are fed through a pulse height analyzer to a cathode ray tube where they may visually be displayed.

A principal disadvantage of the Anger camera system is that the size of the positioning signals and, therefore, the location of the visual flash on a display means depends upon the absolute magnitude of the phototube pulse. Therefore, the accuracy of the positioning signal is a direct function of the height and width of the window presented by the pulse height analyzer. It will be obvious, therefore, that there is a need to construct a more efficient device in which the positioning signals are not dependent on the magnitude of the pulse height derived from the phototubes.

SUMMARY OF THE INVENTION

In view of the above need it is an object of this invention to provide a spatial detection system for use with a scintillation type radiation detector which is independent of the light intensity from the scintillator to locate the position of a light flash generated by a striking ray of radiation.

Further, it is an object of this invention to provide a spatial detection system as in the above object which has a digital readout of the position of each separate light emitting radiation event detected by a scintillation detector.

Yet another object of this invention is to provide a spatial radiation detection system for use with a scintillation type detector in which the binary coded digital readout is obtained by coding the optical image of the scintillator.

Briefly, the present invention is a position-sensitive radiation detection system for optical binary encoding of the position of a radiation event within a scintillation medium, comprising: a plurality of light detecting means for generating an output signal when energized by light striking a sensitive area of said light detecting means; a plurality of focusing means disposed relative to respective ones of the light detecting means for imaging the scintillation medium onto the sensitive areas of the light detecting means; and a plurality of differing configuration masks disposed over respective ones of the plurality of light detecting means in the image path from the focusing means so as to block different portions of the image of the scintillator focused upon each of said plurality of light detecting means to produce at the various outputs from the different light detecting means an indication of the position of an event within the scintillation medium in coded digital form by the presence or absence of a signal from respective ones of the light detecting means.

Other objects and many of the attendant advantages of the present invention will be obvious from the following detailed description taken in conjunction with the accompanying drawings of various embodiments of the present invention.

DETAILED DESCRIPTION

Figure 1:
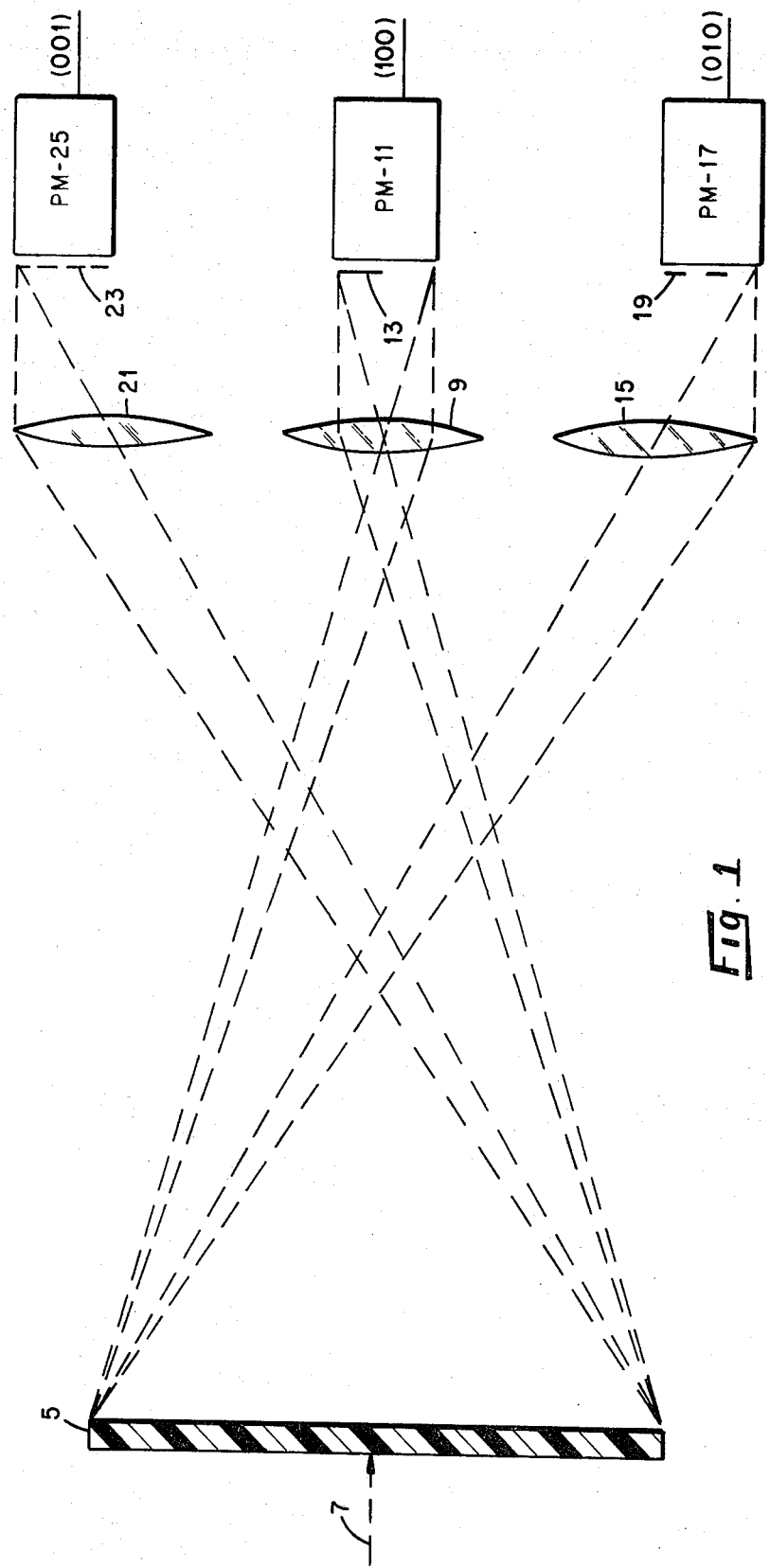
FIG. 1 is a diagram illustrating a simple embodiment of the invention.
Figure 2:
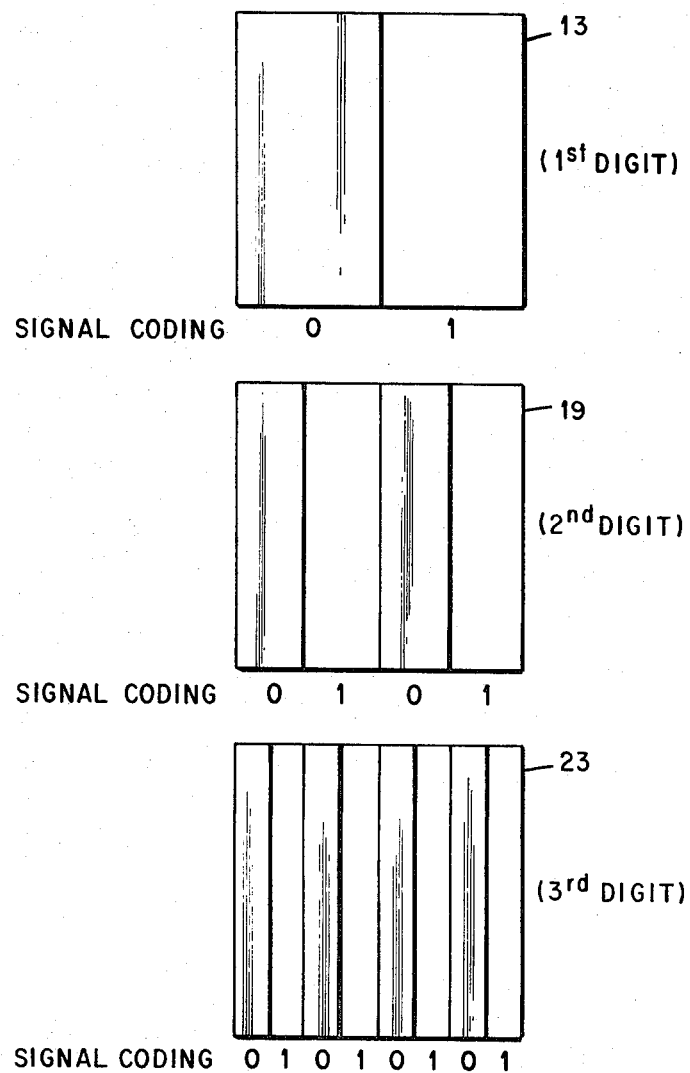
FIG. 2 is a view of the various masks used in the embodiment of FIG. 1.

Referring now to FIG. 1, the invention will be illustrated in its simplest form wherein a block of scintillation material 5 is positioned to receive a beam of radiation 7 on the front face thereof. The image of the back face of scintillator 5 is formed by means of a lens 9 (or mirror) onto the light sensing face of a photomultiplier (PM-11). A mask or screen 13 is disposed in the position of the image to obstruct one-half of the image, as shown by mask 13 in FIG. 2, wherein the shaded portion is constructed of opaque material. PM-11, therefore, only receives light from half of the scintillator. The output signal of the PM tube 11 represents the first digit of a binary number. When the PM-11 is activated by a light pulse from the unmasked portion, a binary "1" signal is present at the output thereof whereas a "no signal" indicating the light pulse is in the masked (shaded) portion represents a binary "0." A similar arrangement of lens 15 focuses the image of the scintillator 5 on the sensitive face of a second PM tube 17. A second mask 19 having two slots, as shown in FIG. 2, is disposed over the face of PM-17 to divide the image of the scintillator 5 into four parts, characterized by the binary "00," "01," "10," and "11," where the first binary digit is the signal from PM-11 and the second digit is the signal from PM-17. A third similar arrangement including lens 21, mask 23 having four slots, and PM tube 25 divides the scintillator image into eight parts, characterized by the binary "000," "001," "010," "011," "100," "101," "110," and "111." The third PM tube 25 provides the third bit of the binary coded signal; and it will be obvious that further masks and PM tubes may be employed to further divide the areas of the scintillator as necessary for a particular application.

The combined information of PM tubes 11, 17 and 25, therefore, uniquely determine the position of a scintillation within the accuracy of a division. Similarly, a set of $n$ PM tubes can resolve $(2^n-1)$ division in a linear array (excluding the zero which represents no signal received by any of the PM tubes). A second set of $n$ PM tubes with image divisions orthogonal to the first set can be used to resolve a checkerboard of $(2^n-1) \times (2^n-1)$ squares. A system of 12 PM tubes can, therefore, resolve $63 \times 63 = 3969$ squares, a system of 14 PM tubes can resolve $127 \times 127 = 16,129$ squares, and so forth.

Figure 3:
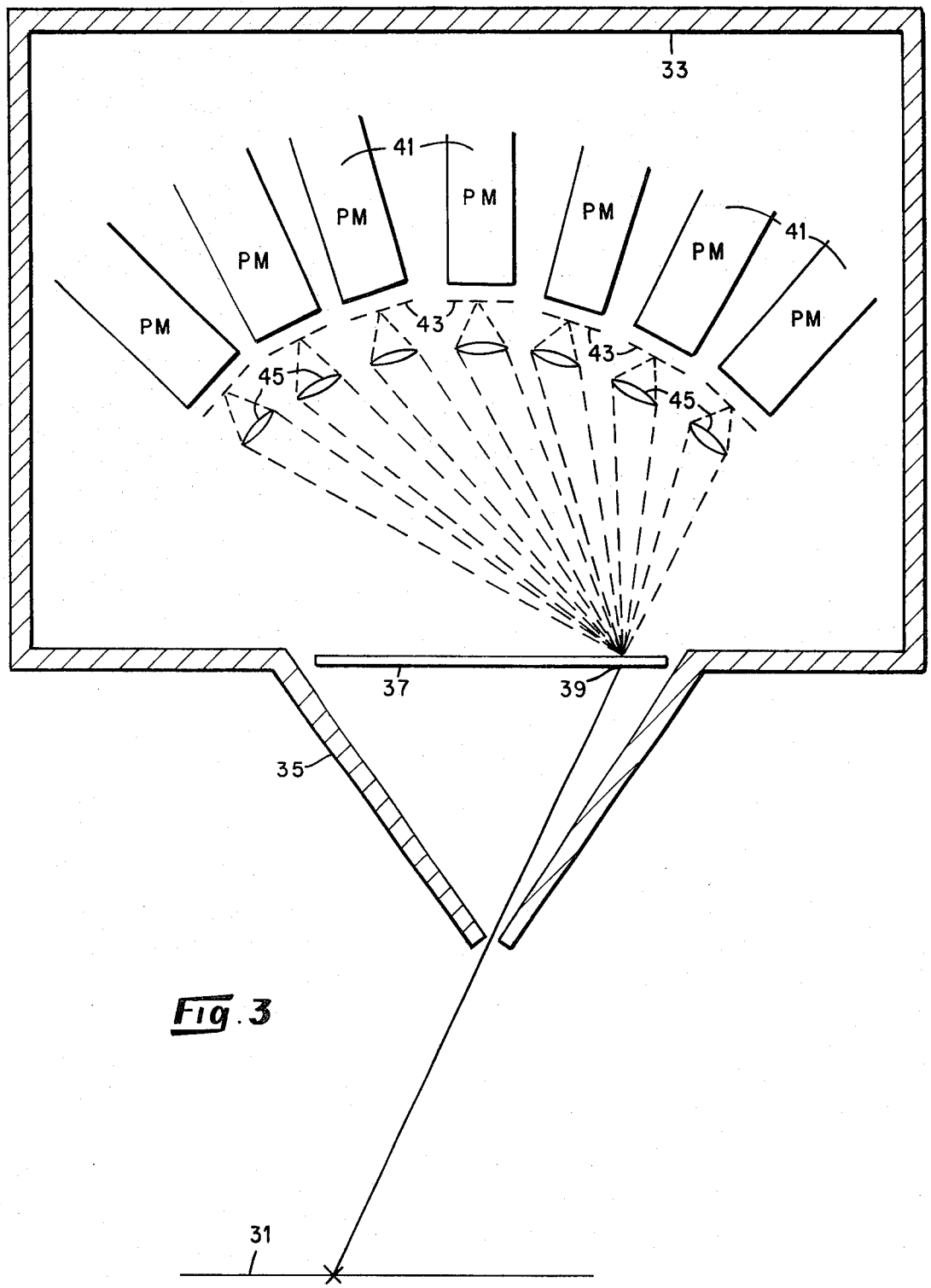
FIG. 3 is a diagram of an embodiment of the present invention employed in a radiation pinhole camera.

Referring now to FIG. 3, it will be shown how this system can be used as a radiation camera for mapping radiation from a distributed source 31. A radiation shielding housing 33 composed of a radiation shielding material such as lead is provided with a radiation collimator 35 which may be a pinhole collimator, as shown, or other well known multi-hole collimator arrangements which will project the image of the radiation source onto a scintillator block 37 placed in the focal plane of the camera to interrupt radiation from the source 31 and produce a light pulse at the position where struck by the radiation, as at point 39. The light from the scintillation at any point 39 is shared by a plurality of PM tubes 41, each positioned to view the image of the scintillator through an appropriate masking screen 43 depending upon the binary digit a particular PM tube 41 represents. The scintillator image is focused upon each PM tube 41 by means of corresponding lenses 45, as in FIG. 1. Each lens 45 images the spot of light on the position of the corresponding screen 43, which encodes signals in binary form at the various outputs of the PM tubes 41 as previously described.

Figure 4:
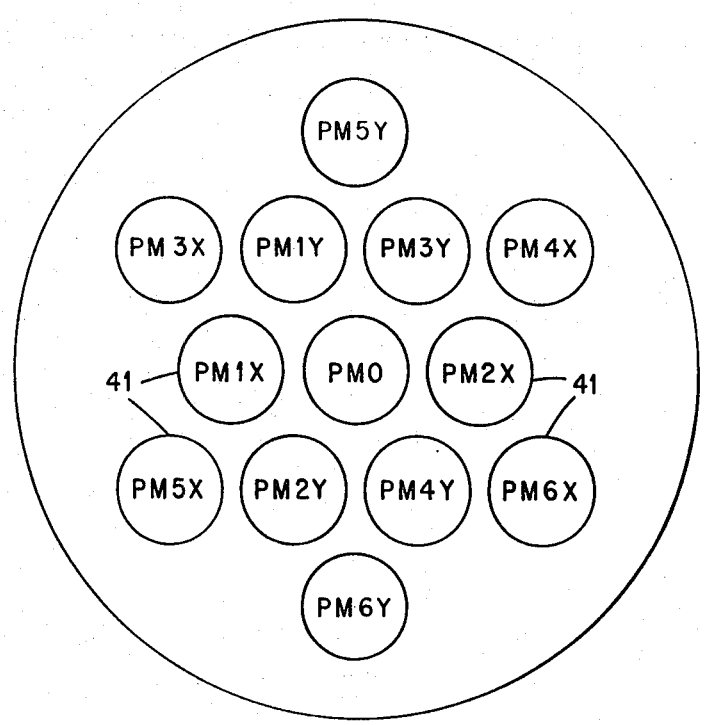
FIG. 4 is a drawing showing a preferred arrangement of the PM tubes of FIG. 3.

A typical array of the PM tubes 41 for a two-dimensional readout is shown in FIG. 4. It will be understood that the particular arrangement of the PM tubes is not critical except that they must be placed so that a corresponding lens may be used to focus the image onto the light sensitive area of the PM tube. Since all of the PM tubes cannot be placed at a central location where an undistorted image of the scintillator 5 may be focused onto each PM tube, the mask may be made to conform to the distorted scintillator image. A mask may be formed from a pattern developed by photographing the distorted image from the respective images in the PM tube focal plane. Thus, each PM tube 41 of FIG. 4 has a corresponding screen 43 which subdivides the scintillator image into 63 equal areas along an X-axis of PM tubes PM-1X through PM-6X and 63 equal areas along the Y-axis by means of PM tubes PM-1Y through PM-6Y. The screens subdivide the scintillator image, as shown in FIG. 2, with additional slots in the screens, i.e., PM-1X and PM-1Y would have one slot over half the image, (screen 13 in FIG. 2) PM-2X and PM-2Y two slots, and so forth with PM-6X and PM-6Y having 32 slots. The screens of the PMY tubes are placed orthogonal to those of the PMX tubes and thus the total effect is to subdivide the scintillator into 3,969 sensitive areas or resolution points, represented by six binary digits along the X-axis and six along the Y-axis wherein each digit is taken at separate PM tube 41 outputs.

Figure 5:
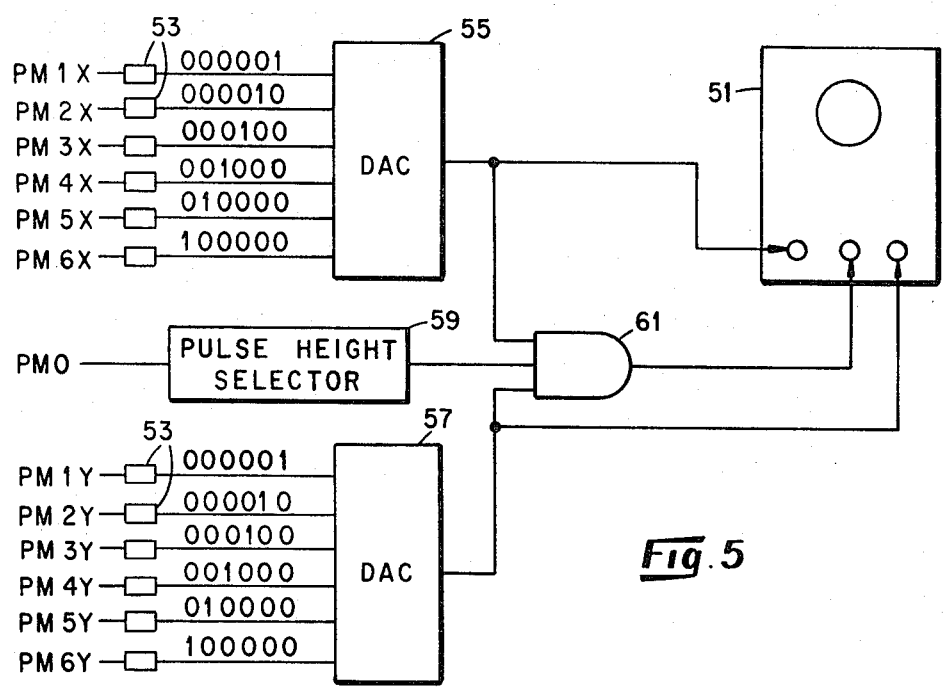
FIG. 5 is a schematic diagram of a digital readout circuit for the PM tubes of FIG. 4.

The signals from the two sets of orthogonal PM tubes 41 may be recorded in a digital storage device or displayed on an X-Y oscilloscope 51, as shown in FIG. 5. Each PM tube 41 output, as represented by the corresponding tube number, is connected to a separate pulse discriminator circuit 53 which converts the pulse from the PM tubes to an appropriate digital signal for input to a digital-to-analog converter DAC 55 for the PMX tubes and a DAC 57 for the PMY tubes. The corresponding binary digits are represented by the binary code on the input lines to DAC's 55 and 57. The output of DAC 55 is connected to the X-axis input of oscilloscope 51 while the output of DAC 57 is connected to the Y-axis input. The accumulated signals from the two sets of orthogonal PM tubes 41 are thus displayed on the oscilloscope 51 so as to reproduce the distribution of radioactivity in the source 31 (FIG. 3).

Since only binary (ON-OFF) signals are used, the pulse height of the scintillation is unimportant in position determination. A wide variety of scintillators, including the well known plastic type, may be used with the above camera system. An additional PM tube (labelled PMO in FIG. 4) may be used with no mask for pulse height discrimination to reduce background radiation effects and assist in pulse height selection by the circuit shown in FIG. 5. The output of phototube PMO is connected to the input of a pulse height selector 59 which generates an output signal when the input signal exceeds a selected level. The output of pulse height selector 59 is connected to one of three inputs of an AND gate 61 which has the remaining two inputs connected, respectively, to the outputs of DAC's 55 and 57. The output of AND gate 61 is connected to the brightener input (Z) of oscilloscope 51. The Z input signal is used to brighten the trace on the oscilloscope 51 whose beam is deflected at that time in a rectangular coordinate system in accordance with the X-axis and Y-axis signals from DAC's 55 and 57, respectively.

A particular advantage of the present invention is that the image of the distributed source 31 is encoded in binary form, and may be directly recorded on magnetic tape via an On-line computer, as well as being converted to an analog signal, as described above. Visualization of a vascular system by injection of a positron emitter into the blood stream, and the use of two radiation cameras in coincidence to locate the position of the emitter without the use of a collimator to image the source onto the camera scintillation will now be described with reference to FIG. 6.

Two identical cameras generally indicated by reference numerals 71 and 73 are disposed diametrically opposed on either side of a distributed source 75 at a known distance (D) from the source 75. It will be understood that the source 75 may represent a human organ in which the source has been localized through the introduction of a compatible positron-emitting isotope by techniques well known in the art. Each of the cameras 71, 73 includes a scintillator block 77, an n number of lenses 79 which focuses the scintillator 77 image onto a corresponding n number of phototubes 81 which each has a screen 83 to mask predetermined portions of the scintillator 77 image from the light sensitive face of the corresponding PM tube 81 to provide a binary coded output from tubes 81 as described above with reference to FIGS. 1 and 2 or preferably the two dimensional PM tube array as shown in FIG. 4. Knowing the distance (D) of the source from the scintillator 77, the location of the source is determined by detecting the coincidence $(X_1, Y_1)$ and $(X_2, Y_2)$ scintillations from the back-to-back 511 KeV annihilation gamma rays emitted from the positron source B+ source 75, thus no collimator is necessary. The binary outputs of PM tubes 81 for each camera 71, 73 may be recorded in a digital recording means such as digital storage medium for subsequent readout to a computer which has been programmed to identify the location of the source 75 from the information recorded by the coincident outputs of cameras 71 and 73. This embodiment is particularly advantageous in that the intensity of the radiation is not reduced by the use of a collimator which allows only the radiation in a restricted path to be directed therethrough.

Figure 6:
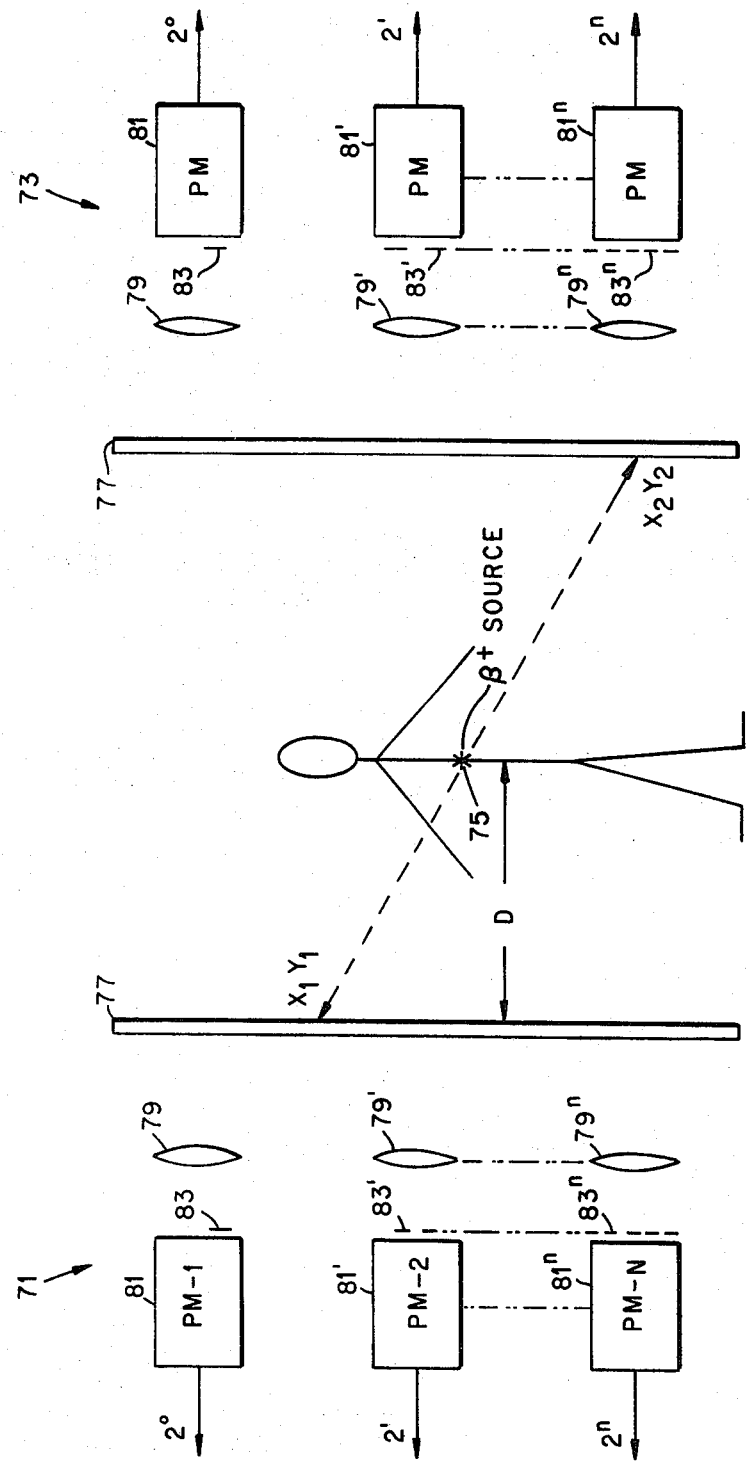
FIG. 6 shows a position camera of a design according to the present invention employing two systems as shown in FIG. 1.
Figure 7:
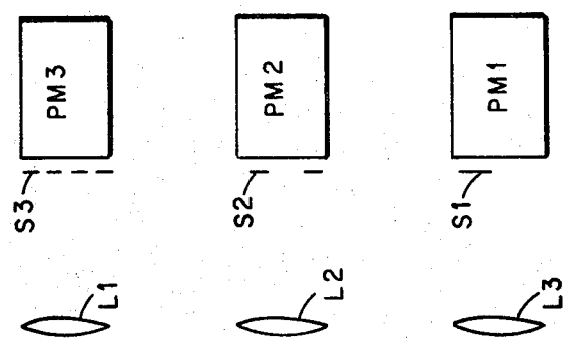
FIG. 7 is an additional embodiment of the invention.
Figure 7:
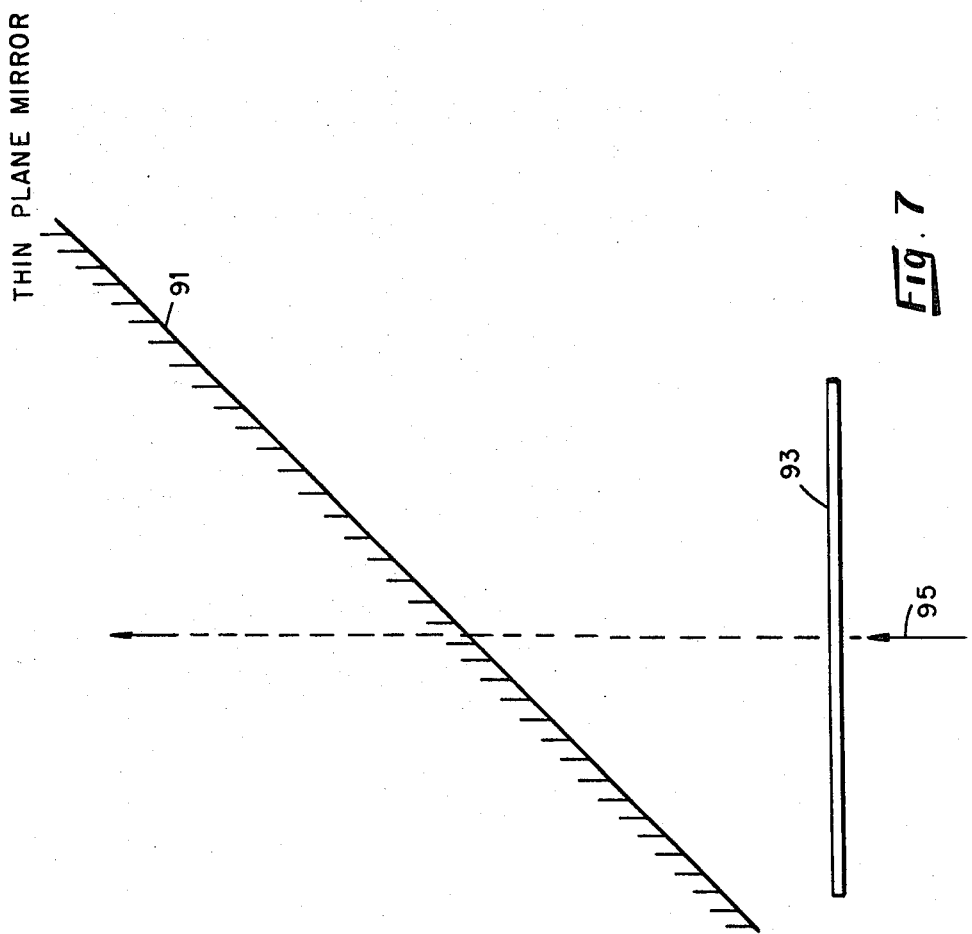

Referring now to FIG. 6, there is shown an alternate embodiment of the invention, as shown in FIG. 1, for use in particle physics experiments wherein the PM tubes (PM1–PM3), lens (L1–L3) and screens (S1–S3) of the light encoding system are identical to those shown in FIG. 1. A thin plane mirror which is positioned to reflect the image of the scintillator block 93 onto the lens systems (L1–L3) so that an incident particle shown as beam 95 does not travel through the light encoding system, and thus does not impede the particle beam travel except for the scintillator material 93. This embodiment may be used in experiments for beam tracing, scattering, mapping or beam profile mapping, etc. With short decay constant scintillator and high speed PM tubes, the counting and mapping capacity of the system can be designed to be better than $10^8$ particles per second. It will be understood that the scintillator block may also be placed at an angle in a similar manner to that of the mirror to achieve the same result.

It is possible to provide a polar coordinate readout as well as the rectangular readout as described above. For example, the camera may be identical to that described above with reference to FIGS. 3, 4, and 5 with the exception of the screen or mask design. The optical image of the scintillator 93 in this case is divided into concentric circles, and binary coded accordingly, so that the radial position of a particle beam, for example, may be read out in digital form. A second set of screens, as in the rectangular coordinate camera of FIG. 3, may be employed to also determine the angular position of a scintillation by employing a second set of masks and PM tubes in which the second set of masks is divided into sectors beginning with the first binary digit ($2^0$) from a half sector mask in the screen, i.e., half the circle opaque and half open. The second binary digit ($2^1$) is provided from a screen divided into alternate opaque quarter sectors; and so on for additional binary digits. Thus, the readout which can be stored in a digital storage device would contain the polar coordinates of events detected by the camera.

Accordingly, it will be seen that a very versatile position-sensitive radiation detection system has been provided for use with a scintillation radiation camera which minimizes the obstruction to the radiation path and errors associated therewith and wherein the light pulses from a scintillator are binary encoded to locate the position at which radiation strikes the scintillator producing a light pulse. It will be obvious to those skilled in the art that various modifications may be made within the scope of the invention as set forth in the following claims. For example, to improve optical coupling, the space between the scintillator and the PM tubes may be sealed and filled with oil or other well known optical coupling compounds, provided the optical image of the scintillator is formed by concave mirrors or an appropriate lens. For lens image forming systems, the index of refraction of the lens has to be substantially different from the media, i.e., only high index convex lenses or low index (hollow) concave lenses are adequate.

What is claimed is:

1. A position-sensitive radiation detection system for optical binary encoding of the position of a light producing radiation event within a scintillation medium, comprising:
   a plurality of light detecting means for generating an output signal when energized by light striking a sensitive area of said light detecting means;
   a plurality of focusing means disposed relative to respective ones of said light detecting means for imaging said scintillation medium onto the sensitive areas of the corresponding light detecting means; and
   a plurality of differing configuration masking means for blocking different portions of said image of said scintillator, thereby producing at the various outputs from the different light detecting means an indication of the position of said event within said scintillation medium in coded digital form by the presence or absence of a signal from respective ones of said plurality of light detecting means.

2. The system as set forth in claim 1 wherein said plurality of masking means each comprises at least one light opaque portion and a transparent portion of a configuration corresponding to a selected portion of said image of said scintillation medium and disposed adjacent said light sensitive areas of respective ones of said plurality of light detecting means.

3. The system as set forth in claim 2 wherein said plurality of masking means is divided into first and second equal groupings of identical different configuration transparent portions, said first grouping of masking means having transparent portions in the form of longitudinal slots for encoding the position of said event along an X-coordinate of said scintillation medium and said second grouping of masking means having transparent portions in the form of longitudinal slots orthogonal to said slots of said first grouping for encoding the position of said event along a Y-coordinate of said scintillation medium.

4. The system as set forth in claim 3 wherein each of said focusing means includes a lens disposed to view the entire area of said scintillation medium and focus the viewed image onto a corresponding one of said light detecting means.

5. The system as set forth in claim 4 wherein each of said light detecting means is a photomultiplier tube.

6. The system as set forth in claim 5 wherein it comprises a radiation camera for recording the image of a distributed nuclear radiation source, further including a radiation collimator means for projecting the image of said distributed radiation source onto said scintillation medium and means for recording and displaying the binary coded outputs of said light detecting means as a reproduction of the image of said distributed radiation source.

7. The system as set forth in claim 6 wherein said recording and displaying means includes a first digital-to-analog converter connected to the outputs of said first grouping of light detecting means for providing at an output thereof an analog signal whose amplitude is indicative of the position of individual radiation events along said X-coordinate of said scintillation medium, a second digital-to-analog converter connected to the outputs of said second grouping of light detecting means for providing at an output thereof an analog signal whose amplitude is indicative of the corresponding position of said individual radiation events along said Y-coordinate of said scintillation medium, and an oscilloscope having an X-coordinate input and a Y-coordinate input connected, respectively, to the outputs of said first and second digital-to-analog converters.

8. The system as set forth in claim 4 wherein said scintillation medium is disposed at an angle with respect to the path of impinging radiation so that said path of impinging radiation is attenuated only by said scintillation medium.

9. The system as set forth in claim 4 further including a nuclear radiation pervious mirror disposed at an angle with respect to the path of radiation impinging upon said scintillation medium for reflecting the image of said scintillation medium onto said focusing means so that said path of impinging radiation is attenuated only by said scintillation medium and said mirror.

10. A radiation camera for mapping a positron source by simultaneously detecting back-to-back annihilation gamma rays emitted from said source, comprising:

a first position-sensitive radiation detection system for optical binary encoding of the position of a light producing radiation event within a first scintillation medium disposed on one side of said source;

a second position-sensitive radiation detection system for optical binary encoding of the position of a light producing event within a second scintillation medium disposed diametrically opposed on the other side of said source of a known distance from said source, each of said position-sensitive radiation detection mediums including:

a plurality of light detecting means for generating an output signal when energized by light striking a sensitive area of said light detecting means;

a plurality of focusing means disposed relative to respective ones of said light detecting means for imaging said scintillation medium onto the sensitive areas of the corresponding light detecting means; and a plurality of differing configuration masking means for blocking different portions of said image of said scintillator, thereby producing at the various outputs from the different light detecting means an indication of the position of said event within said scintillation medium in coded digital form by the presence or absence of a signal from respective ones of said plurality of light detecting means.

* * * * *